United States Patent [19]

Sengoku et al.

[11] Patent Number: 4,887,173

[45] Date of Patent: Dec. 12, 1989

[54] STORAGE APPARATUS INCLUDING HEAD DRIVE CONTROL

[75] Inventors: Masaharu Sengoku; Kimiyo Takahashi, both of Hyogo, Japan

[73] Assignee: Mitsubishi Denki Kabushiki Kaisha, Tokyo, Japan

[21] Appl. No.: 262,327

[22] Filed: Oct. 25, 1988

[30] Foreign Application Priority Data

Oct. 30, 1987 [JP] Japan ................................ 62-273102

[51] Int. Cl.⁴ .......................... G11B 33/00; G05B 1/06

[52] U.S. Cl. .............................. 360/78.04; 360/77.03; 318/632

[58] Field of Search ............. 360/69, 75, 77.03, 78.04; 369/32, 47, 48, 44; 318/632

[56] References Cited

U.S. PATENT DOCUMENTS

| | | | |
|---|---|---|---|
| 4,380,737 | 4/1983 | Sanders | 330/279 |
| 4,563,775 | 1/1986 | Yokosuka | 330/279 |
| 4,748,393 | 5/1988 | Fincher et al. | 360/78.04 |

FOREIGN PATENT DOCUMENTS 60-101777 6/1985 Japan .

*Primary Examiner*—Aristotelis M. Psitos
*Assistant Examiner*—David L. Robertson
*Attorney, Agent, or Firm*—Wolf, Greenfield & Sacks

[57] ABSTRACT

In a magnetic disk storage apparatus, a magnetic disk, magnetic head, head positioning mechanism and head servo circuit are employed. To avoid an oscillation phenomenon of a head servo system, there is provided a gain controlling system so as to adjust an amplification gain of the servo circuit.

6 Claims, 4 Drawing Sheets

VARIABLE GAIN AMPLIFIER
24
20
17
7
13
16
SERVO CIRCUIT
ACTUATOR
POSITIONING SENSOR
A
HEAD SPEED DEMODULATOR
COMPUTER
READ/WRITE CIRCUIT
HEAD
RECORDING MEDIUM
18
4
3
19
21
A
GAIN CONTROLLER
C
COMPARATOR
B
22
33

16
HEAD SPEED DEMODULATOR
A
13
POSITIONING SENSOR
3
RECORDING MEDIUM
A
B
22
21
COMPARATOR
7
ACTUATOR
4
HEAD
C
33
GAIN CONTROLLER
20
VARIABLE GAIN AMPLIFIER
24
17
SERVO CIRCUIT
18
READ/WRITE CIRCUIT
19
COMPUTER

STORAGE APPARATUS INCLUDING HEAD DRIVE CONTROL

BACKGROUND OF THE INVENTION

1. Field of the Invention

The present invention generally relates to a storage, apparatus employed in a computer and/or a peripheral device of a computer. More specifically, the present invention is directed to a storage apparatus capable of preventing an oscillation phenomenon of a built-in servo mechanism.

2. Description of the Related Art

The storage apparatus as described above is, in general, known as, for instance, a magnetic-disk apparatus. A typical magnetic-disk apparatus is disclosed in, for example, Japanese KOKAI (Disclosure) Patent Application No. 60-101777 (1985). FIG. 1 is a side view of this magnetic-disk apparatus. Constructions of the magnetic-disk apparatus will now be described. In FIG. 1, reference numeral 1 denotes a supporting plate as a base; 2 is a rotating apparatus, e.g., a spindle motor attached on the supporting plate 1; 3 a recording medium, e.g., a magnetic disk attached to a rotating shaft of the rotating apparatus 2; 4 a head, e.g., a magnetic head arranged so as to face the recording plane or track, e.g., the lower plane of the recording medium 3; 5 a pressure spring to press the head 4 to the recording surface; 6 an arm to support one end of the pressure spring 5; and 7 an actuator to move and position the head 4 in the radial direction of the recording medium 3. The actuator 7 comprises: a carriage 8 to support and fix one end of the arm 6; a bearing 9 to guide and move the carriage 8 on the supporting plate 1; a cylindrical coil 10 attached to one end of the carriage 8; a magnet 11 arranged so as to face the coil 10; and a yoke 12 to position the magnet 11. Reference numeral 13 denotes a positioning sensor to detect the position of the head 4. The positioning sensor 13 comprises: a head speed converter 14 such as a photo diode fixed to the supporting plate 1; and an optical linear scale 15 attached to the carriage 8.

FIG. 2 is a block diagram showing a circuit of a drive control section in the magnetic-disk apparatus of FIG. 1. In FIG. 2, reference numeral 16 denotes a head speed demodulator for differentiating and shaping position information from the sensor 13 and thereby detecting a positioning speed of the head 4 in conjunction with the above-described head speed converter 14 and linear scale 15. Reference numeral 17 denotes a servo circuit for receiving a positioning command from a computer 19 and driving the actuator 7 while comparing the position information from the sensor 13 with speed information from the head speed demodulator 16.

Reference numeral 18 denotes a read/write circuit to record (write) or reproduce (read out) information to/from the recording medium 3 through the head 4. The computer 19 outputs a transport positioning command to the servo circuit 17 and also outputs a recording/reproduction command to the read/write circuit 18.

The operations of the magnetic-disk apparatus shown in FIG. 1 and the conventional storage apparatus shown in FIG. 2 will now be described. When the recording medium 3 is rotated by the rotating apparatus 2, a buoyancy occurs to the head 4 by the viscosity air flow on the surface of the recording medium 3. Since the buoyancy to the head 4 is balanced to the pressing force of the pressure spring 5, the recording medium 3 continuously rotates with a micro air gap held between the medium 3 and the head 4. When the transport positioning command is output from the computer 19 to the servo circuit 17, a current flows through the coil 10 and the force due to the Fleming's left-hand law acts on a magnetic circuit constructed of the magnet 11 and yoke 12. Therefore, the carriage 8 is driven and the head 4 is moved and positioned while seeking the information tracks which are coaxially arranged on the recording medium 3 at predetermined intervals in the radial direction (along the horizontal direction in FIG. 1). At this time, the servo circuit 17 positions the head 4 to the commanded position on the basis of the position information derived from the sensor 13. After completion of the transportation and positioning of the head 4, a recording/reproduction command is output from the computer 19 to the read/write circuit 18. The head 4 records or reproduces information to/from the recording medium 3. The positioning of the head 4 is performed by a servo mechanism constructed of the servo circuit 17, actuator 7, sensor 13, and head speed demodulator 16 on the basis of an ordinary automatic control theory. For instance, as snown in Hasegawa and Takai, "FOUNDATION AND APPLICATION OF AUTOMATIC CONTROL", (Jikkyo Technical Engineering Books), page 248, a gain margin of several dB is needed to make the servo mechanism stably operate.

In the conventional storage apparatus, the actuator 7 and sensor 13 are constructed by assembling mechanical parts. Therefore, there are problems such that a mechanical oscillation phenomenon occurs due to fluctuations of component quality or variations in assembly, so that the gain margin is reduced, the servo mechanism becomes unstable, the oscillation phenomenon is caused, and the head 4 cannot be positioned to the desired position of the recording medium 3.

The present invention is made to solve such conventional problems and it is an object of the invention to provide a storage apparatus which can prevent the oscillation phenomenon of a servo mechanism by way of electronic means.

SUMMARY OF THE INVENTION

The above-described object of the invention is achieved by providing a storage apparatus (100) comprising:

a recording medium (3) rotatably driven for storing data;

head means (4) for writing/reading said data on/from a recording area of said recording medium (3) while being positioned opposite to a predetermined recording area of said recording medium (3);

actuator means (7) for positioning said head means (4) to said predetermined recording area of the recording medium (3);

a sensor (13) for sensing a present position of said head means (4) with respect to said recording area of the recording medium (3) to produce a sensor signal (A);

a servo circuit (17) for controlling a positioning operation of said actuator means (7) based upon said sensor signal (A);

a reference signal generator (22) for generating a reference signal (B);

a comparator (21) for comparing said sensor signal (A) with said reference signal (B) to produce a comparator signal (C);

a gain controller (30) for processing said comparator signal (C) to produce a gain control signal; and, a variable gain amplifier (20) interposed between said servo circuit (17) and actuator means (7), for varying an amplification gain of said servo circuit (17) so as to suppress an oscillation phenomenon of a servo system constructed of said servo circuit (17), actuator means (7), and sensor (13).

According to a storage apparatus of the invention, a gain margin of the servo mechanism is previously assured by the variable gain amplifier, and then a desired gain of the variable gain amplifier at which the gain margin is lost and the servo mechanism starts oscillating is found out by the comparator.

BRIEF DESCRIPTION OF THE DRAWINGS

The object and features of the rnvention will become apparent with reference to the following specification and the drawings, in which.

DETAILED DESCRIPTION OF THE PREFERRED EMBODIMENT CONSTRUCTION OF STORAGE APPARATUS

Figure 1:
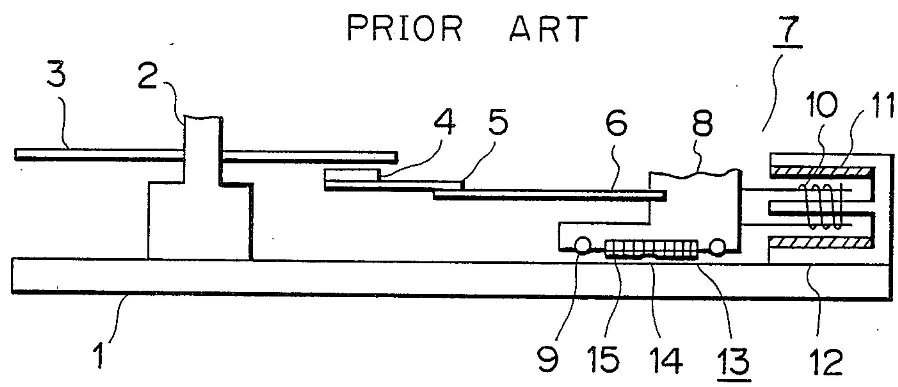
FIG. 1 is a schematic diagram of a conventional storage apparatus.

Since a major construction of a storage apparatus 100 according to an embodiment of the present invention is the same as that shown in FIG. 1. a detailed description thereof is omitted.

CIRCUIT ARRANGEMENT OF DRIVE CONTROL UNIT

Figure 3:
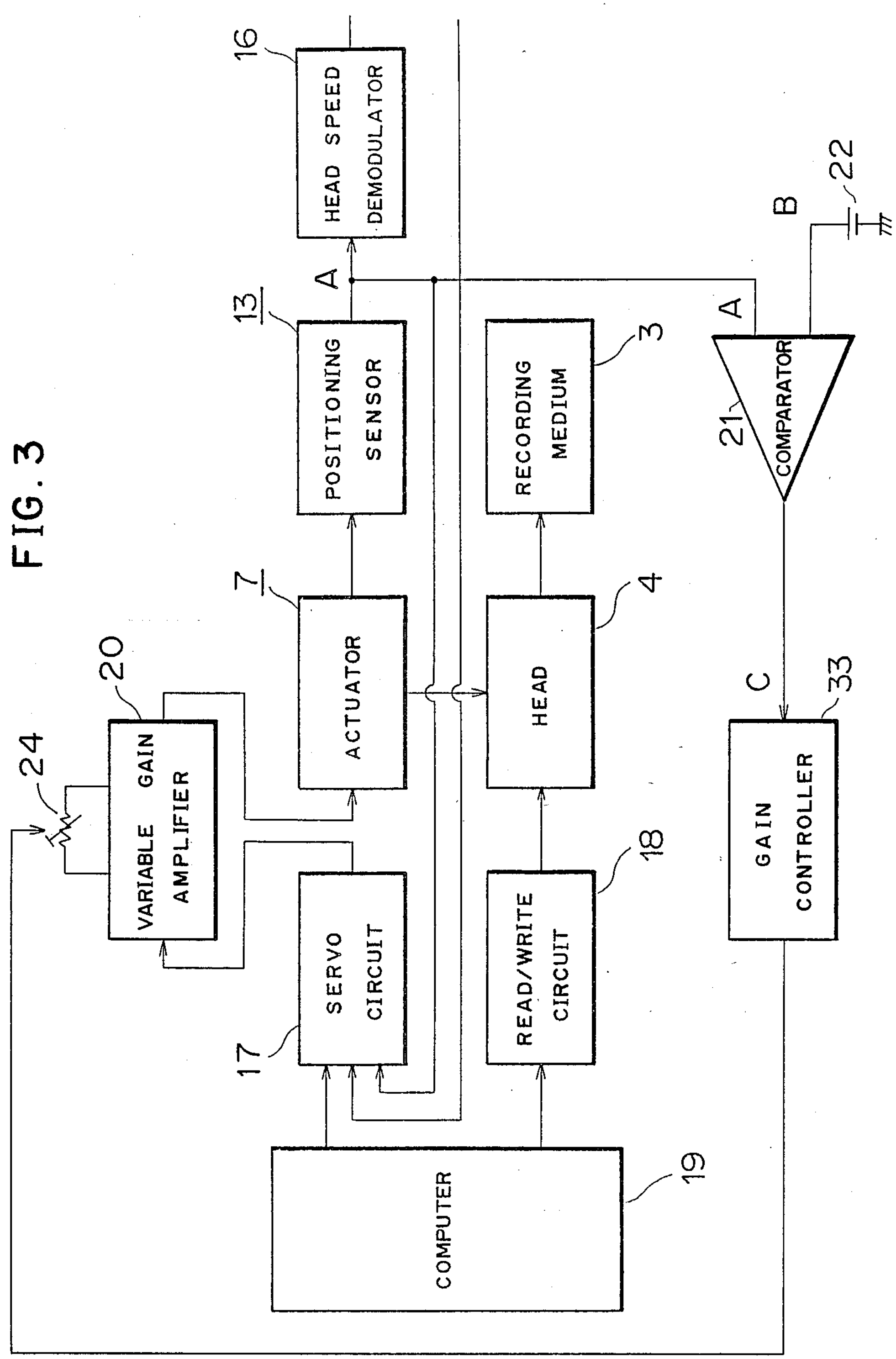
FIG. 3 is a schematic block diagram of a head drive control unit employed in a storage apparatus according to a preferred embodiment of the invention.

FIG. 3 shows a circuit diagram of a head drive control unit for use in the storage apparatus 100 of the embodiment.

Figure 2:
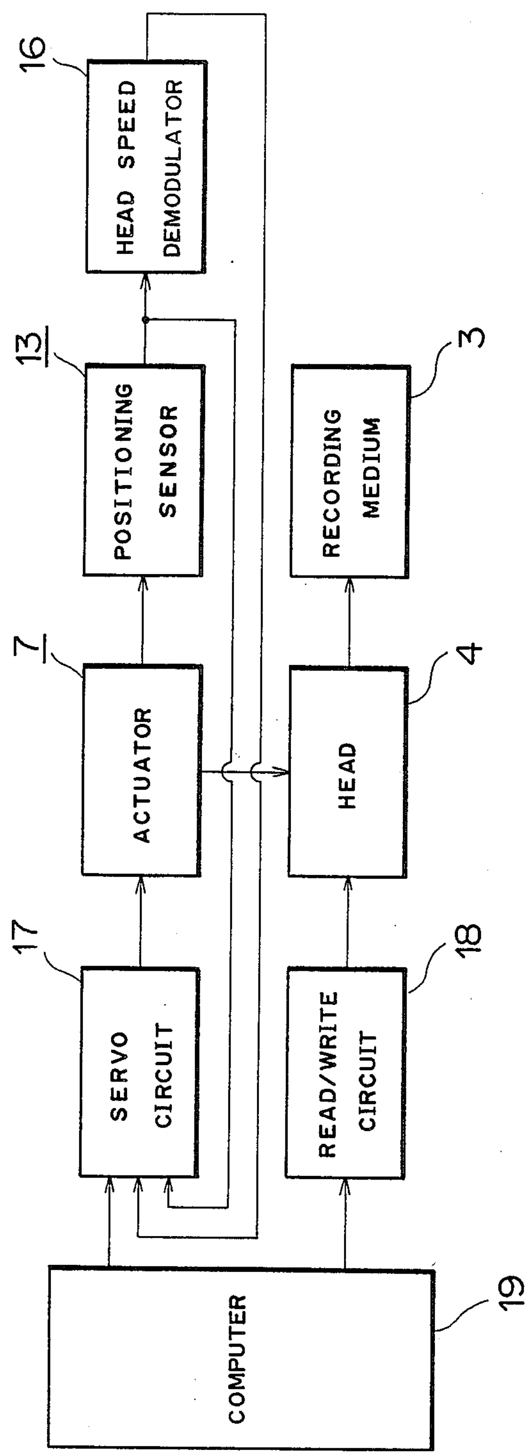
FIG. 2 is a schematic block diagram of a head drive control unit employed in the conventional storage apparatus shown in FIG. 1.

As will be obvious from the circuit of FIG. 3, since the circuit arrangement of the embodiment is similar to that of FIG. 2, the same or similar parts and components as those in FIG. 2 are designated by the same reference numerals and their descriptions are omitted.

Figure 4:
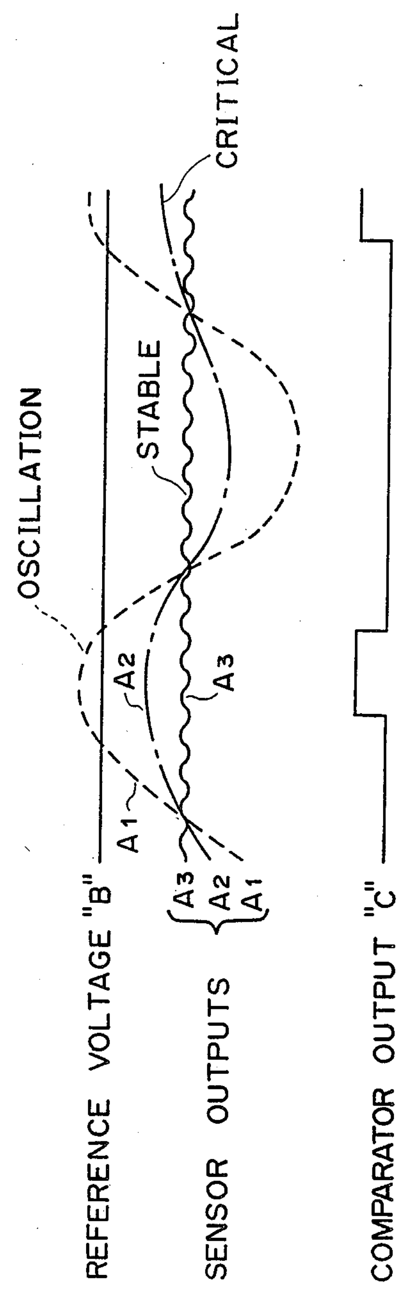
FIG. 4 is a waveform chart of input/output signals of a comparator employed in the head drive control circuit.

Reference numeral 20 denotes a variable gain amplifier arranged between the servo circuit 17 and the actuator 7. A gain of the amplifier 20 can be changed by a variable resistor 24 (this function will be described hereinlater). A comparator 21 is connected to an output terminal of the sensor 13. The comparator 21 compares an output "A" of the sensor 13 with an output "B" of a reference voltage generator, e.g., a battery 22, and then generates an output "C" when the level of the output "A" is higher than that of the output "B". FIG. 4 is a diagram showing waveforms of the output "A" of the sensor 13, output "B" of the reference voltage generator 22, and output "C" of the comparator 21 shown in FIG. 3. Outputs "$A_1$", "$A_3$", and "$A_2$" of the sensor 13 indicate the output conditions where the gain of the variable gain amplifier 20 is high, low, and middle, respectively.

A gain controller 33 for receiving the output signal "C" of the comparator 21 and performing a predetermined arithmetic operation of a gain margin or the like, thereby controlling the gain of the variable gain amplifier 20, is arranged between the output of the comparator 21 and the amplifier 20.

HEAD DRIVE CONTROLLING

The head drive controlling operation of the embodiment of the invention shown in FIG. 3 will now be described with reference to the waveform diagram of FIG. 4. When the gain of the amplifier 20 is set to a high value by changing a resistance value of the variable resistor 24 of the amplifier 20 (for instance, by rotating a potentiometer by fingers), the servo mechanism becomes unstable and starts oscillating. The waveform of the output "A" of the sensor 13 becomes the oscillating waveform as shown at "$A_1$" in FIG. 4 and this output level becomes higher than that of the output "B" of the reference voltage generator 22, so that the comparator 21 produces the high-level output signal "C". By monitoring the state of the output "C" of the comparator 21 by using an oscilloscope or the like (not shown), the position of the setting level of the variable resistor 24 at the time point of the generation of the high-level output signal "C" is memorized or a mark is manually written to this position. This position is understood as a point at which the gain margin of the servo mechanism is lost. Subsequently, the resistance value of the variaole resistor 24 is varied to reduce the gain of the amplifier 20. When the output "A" of the sensor 13 is set to the level "$A_2$", this level is lower than the level of the output "B" of the reference voltage generator 22. Thus, the comparator 21 does not produce the high-level output "C". The gain of the amplifier 20 is further reduced and the difference between the position of the variable resistor 24 when the output "A" of the sensor 13 becomes stable (in the state in which the gain margin of several dB of the servo mechanism exists) as indicated at "$A_3$" and the position of the variable resistor 24 when the output "A" of the sensor 13 became unstable as indicated at "$A_1$" as mentioned above is sampled and recorded for a predetermined number of magnetic-disk apparatuses. The average value of the resultant differences of the marked positions of the predetermined number of magnetic-disk apparatuses is calculated. Thereafter, the resistance value of the variable resistor 24 of the variable gain amplifier 20 is changed while monitoring the output "C" of the comparator 21. By merely changing the position by the distance corresponding to only the average value from the position at which the high-level output signal "C" was generated, the gain margin can be assured. Thus, there is no need to monitor the analog signal such as the output "A" of the sensor 13 by means of the oscilloscope. The gain adjustment is simplified and the gain adjusting time is also reduced.

In the foregoing descriptions of head drive controlling operations, the gain of the variable gain amplifier 20 has manually been adjusted and the oscillating phenomenon of the servo mechanism has been suppressed. All of such manual operations may be processed by operating the gain controller 30 shown in FIG. 3. That is, the output signal "C" of the comparator 21 is received and subjected to a predetermrned arithmetic operation, thereby calculating the gain margin. On the basis of this result, the gain of the variable gain amplifier 20 is varied, thereby changing the resistance value of the variable resistor 24 so as to obtain a predetermined gain. These series of operations are performed under the control of a microprocessor. The variable gain amplifier 20 is a well-known amplifier and may be easily realized by enabling a resistance value of a feedback resistor to be varied by using, e.g., an operational amplifier (not shown).

Further, the gain controller 30 may be also easily realized by combining well-known circuits. For instance, the means for calculating the average value itself is well known.

MODIFICATIONS

In the magnetic-disk apparatus of the embodiment mentioned above, the case where the carriage 8 rectilinearly moves has been described. However, the invention is not limited to this system. The drive control system of the invention may be also applied to other positioning drive systems such as oscillating movement, rotating movement, and the like.

On the other hand, although the position of the head 4 has been detected by the sensor 13, it may be also detected by the head 4 itself or other proper head.

Further, although the embodiment has been described with regard to the storage apparatus using the magnetic-disk apparatus, the invention may be also applied to sound recording apparatus, image recording apparatus, or storage apparatus using the optical system, magnetooptic system, laser system, electric field system, electric charge system, or many other systems.

As described in detail above, according to the invention, there are provided a variable gain amplifier in which an amplification gain of a servo circuit can be changed, a reference voltage generator, and a comparator for comparing an output of a head position sensor and an output of the reference voltage generator, wherein a gain margin of a servo mechanism is previously assured. Therefore, there is an advantage such that it is possible to obtain a storage apparatus which can prevent such a problem that the head cannot be positioned since the servo mechanism becomes unstable or oscillates.

What is claimed is:

1. A storage apparatus comprising:

a recording medium rotatably driven for storing data;

head means for writing/reading said data on/from a recording area of said recording medium while being positioned opposite to a predetermined recording area of said recording medium;

actuator means for positioning said head means to said predetermined recording area of the recording medium;

a sensor for sensing a present position of said head means with respect to said recording area of the recording medium to produce a sensor signal;

a servo circuit for controlling a positioning operation of said actuator means based upon said sensor signal;

a reference signal generator for generating a reference signal;

a comparator for comparing said sensor signal with said reference signal to produce a comparator signal;

a gain controller for processing said comparator signal to produce a gain control signal; and, a variable gain amplifier interposed between said servo circuit and actuator means, for varying an amplification gain of said servo circuit in response to said gain control signal so as to suppress an oscillation phenomenon of a servo system constructed of said servo circuit, actuator means, and sensor.

2. A storage apparatus as claimed in claim 1; further comprising a head speed demodulator for demodulate said sensor signal derived from said sensor to supply velocity information of said head means to said servo circuit, whereby said servo circuit controls said positioning operation of said actuator means based upon both said present position and velocity information of said head means.

3. A storage apparatus as claimed in claim 1, further comprising a read/write circuit for reading/writing said data on/from said predetermined recording area of the recording medium via said head means.

4. A storage apparatus as claimed in claim 1, wherein said recording medium is a magnetic disk, and said head means is a magnetic head.

5. A storage apparatus as claimed in claim 1, wherein said reference signal generator is a battery, and said variable gain amplifier is an operational amplifier having a variable feedback resistor.

6. A storage apparatus as claimed in claim 1, wherein said gain controller includes;

a gain margin calculator for calculating a gain margin in response to said comparator signal from said comparator; and a gain control signal generator for generating said gain control signal by processing said gain margin under the control of a microprocessor.

* * * * *